United States Patent [19]
Thompson

[11] Patent Number: 5,999,521
[45] Date of Patent: Dec. 7, 1999

[54] SYSTEM AND METHOD FOR PROVIDING LOCAL SERVICES TO A WIRELESS TELEPHONE SERVED BY ANOTHER SYSTEM

[75] Inventor: Robin Jeffrey Thompson, Batavia, Ill.

[73] Assignee: Lucent Technologies Inc., Murray Hill, N.J.

[21] Appl. No.: 08/870,329

[22] Filed: Jun. 6, 1997

[51] Int. Cl.⁶ .............................. H04Q 7/00; H04J 3/24; H04L 12/66
[52] U.S. Cl. ................. 370/328; 370/349; 370/350; 455/433; 455/466
[58] Field of Search .................... 370/328, 349, 370/331, 395, 352, 354, 401; 455/432, 433, 414, 445, 426, 466, 560

[56] References Cited

U.S. PATENT DOCUMENTS 5,305,308  4/1994  English et al. .................... 370/32.1
5,438,565  8/1995  Hemmady et al. ..................... 370/60

FOREIGN PATENT DOCUMENTS

| 0664658 | 7/1995 | European Pat. Off. | ....... H04Q 11/04 |
| WO9105429 | 4/1991 | WIPO | ............................. H04M 7/00 |
| WO9642176 | 12/1996 | WIPO | ............................. H04Q 7/24 |

OTHER PUBLICATIONS

A. Balakrishnan, "Wireless And Service Mobility", *Annual Review Of Communications*, vol. 50, 1997, pp. 859–865.

*Primary Examiner*—Dang Ton
*Assistant Examiner*—David R Vincent
*Attorney, Agent, or Firm*—Michael B. Johannesen

[57] ABSTRACT

A system and method that controls a wireless call from a home system regardless of its current serving system. In this system, when a wireless telephone is roaming, the serving system sets up a transmission path to the home system. The home system performs all of the origination functions as if the wireless unit were in the local area and communicates via the transmission path, with the wireless unit using the serving system as an extension of the home system.

12 Claims, 3 Drawing Sheets

SYSTEM AND METHOD FOR PROVIDING LOCAL SERVICES TO A WIRELESS TELEPHONE SERVED BY ANOTHER SYSTEM

TECHNICAL FIELD

This invention relates to the area of wireless telephony, and, more specifically to the area of providing features and other home system services to a mobile unit when it is served by another system.

BACKGROUND OF THE INVENTION

Wireless telephony has grown at an exponential rate over the past several years. As more people use wireless telephones, service providers must add additional equipment in order to keep up with the demand for service. Thus, there are several manufacturers selling such mobile telephony equipment, wherein some equipment provides features and services not available on other systems. This sometimes becomes a problem when a wireless unit moves out of the coverage area of its home office and "roams".

Currently, there are standards for systems communications when a wireless unit is roaming. When a call is made to a wireless telephone, the incoming call is directed to the home switching office ("home system"), or MTSO. The home system performs a lookup on the wireless unit's directory number and determines that the wireless unit is not in the coverage area. The home system then determines the last location of the wireless unit and sends a message to that MTSO to determine if the wireless unit is still there. If it is, then the serving system sets up a trunk between the home and serving systems.

Conversely, when a wireless unit attempts to place a phone call with a foreign wireless system, it "registers", wherein its identification is stored in a specific location in memory in the MTSO. The serving system then sends out a query to locate the home system of this wireless unit. The home system sends some records of the wireless unit to the serving system. A call can then completed through the facilities of the serving system.

In the above two scenarios, the serving system is the controlling system for the roaming wireless unit. The serving system may not necessarily have the same facilities, functions and services that the home system has. For example, some systems provide the service of voice dialing with subscriber-specific voice dialing lists. Such lists are very memory-intensive, and are, thus, not transmitted from a home system to a serving system, because such transmission would take a lot of time and a lot of resources, and the serving system may not be able to support this feature in the first place. Therefore, the wireless unit loses features when it roams.

Furthermore, certain personal communication services (PCS) provide "dial tone" interface to the PCS system. In dial tone PCs, a path to the switch is set up whenever the wireless unit performs the equivalent of an "offhook". The MTSO then sends a dial tone to the wireless unit and the wireless unit sends digits which are then translated into dual tone multifrequency (DTMF) signaling, and the call is processed as if it were a line origination. However, due to the limited deployment of such PCS systems, it is not currently possible for a PCS wireless unit to roam.

Therefore, a problem in the art is that there is no system for providing a wireless unit with all of the features and services of its home system which is served by a foreign system.

SUMMARY OF THE INVENTION

This problem is solved and a technical advance is achieved in the art by a system and method that uses transmission facilities to control a call to or from any serving system from a home system. In this system, when a wireless telephone is roaming, the serving system sets up a transmission path to the home system. The home system performs all of the origination functions as if the wireless unit were in the local area. Thus, this invention provides a home-based system for roaming in wireless communications networks.

BRIEF DESCRIPTION OF THE DRAWINGS

A more complete understanding of the invention may be obtained in consideration of the following description in conjunction with the drawings in which.

DETAILED DESCRIPTION

Figure 1:
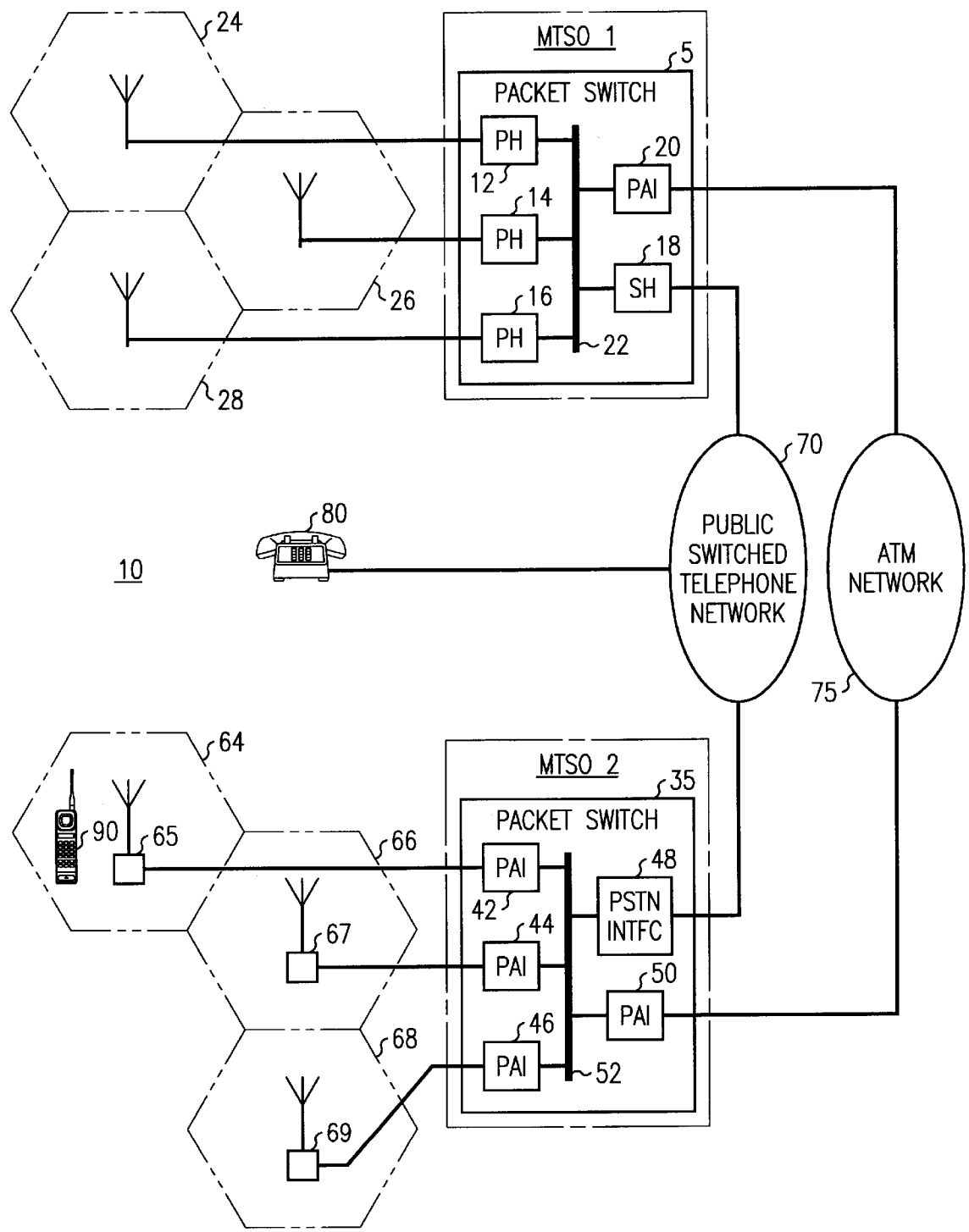
FIG. 1 is a block diagram of an exemplary wireless switching network employing this invention.

Turning now to FIG. 1, a block diagram of a wireless telecommunications system 10 in which a system and method of this invention may be used is shown. For purposes of explaining this exemplary embodiment, there are two mobile telephone switching offices, MTSO 1 and MTSO 2. MTSOs 1 and 2 are illustratively distributed control, electronic telephone switching systems such as the system disclosed in U.S. Pat. No. 4,592,048, issued to M. W. Beckner, et al., on May 27, 1986. Alternatively, MTSO 1 and MTSO 2 may be distributed control digital switches, such as a 5ESS® switch manufactured by Lucent Technologies and described in the AT&T Technical Journal, Vol. 64, No. 6, July-August, 1985, pp 1303–1564. For purposes of describing this invention, MTSOs 1 and 2 use a code division multiple access (CDMA) air interface. This invention is being described in terms of CDMA, however, the application of this invention is much broader. This invention is especially applicable to any error interface that uses subrate voice coding techniques (for example, time division multiple access (TDMA)).

In a CDMA system, MTSO 1 includes packet switch 5. Packet switch 5 includes a plurality of units, packet handlers 12, 14, and 16, speech handler 18, and packet access interface (PAI) 20 connected to packet bus 22. Packet handlers 12, 14, and 16 support cells 24, 26, and 28, respectively. For purposes of describing this invention, only three cells and packet handlers are illustrated. However, in reality, many more would be employed. Furthermore, there may be a plurality of speech handlers, such as speech handler 18, connected to packet bus 22. Finally, each MTSO may include more than one packet switch.

MTSO 2 is described herein as using IS-634 base stations. In this system, MTSO 2 also includes a packet switch 35. Packet switch 35 includes a plurality of packet access interfaces (PAI) 42, 44, 46, and 50, and a PSTN interface 48, connected to packet bus 52. PAIs 42, 44, and 46 support cells 64, 66, and 68, respectively; wherein, according to IS-634, base stations 65, 67, and 69 provide subrate-to-datarate conversion. In this embodiment, base stations then encapsulate voice datarate ATM cells. Again, for purposes of describing this invention, only three cells and packet handlers are illustrated.

CDMA cells 24, 26, 28, 64, 66, and 68, send and receive spread spectrum signals to/from wireless units and translate these signals to/from a packetized stream. According to the exemplary embodiment of this invention, this CDMA system transmits/receives voice or data at the relatively slow rate of approximately 8 or 13 Kbps to its respective packet handler. Packet handlers 12, 14, and 16 add an address of a speech handler to the packetized speech and sends the packetized speech on the packet bus 22. The packet is either received by speech handler 18, where it is processed into a digital 64 Kbps pulse code modulated (PCM) stream as used in standard digital switching. This digital stream may then be moved from speech handler 18 into the public switched telephone network 70. However, a speech handler does not necessarily have to reside on the same packet switch as the cell site's packet handler. To this end, a packet access interface 20 receives packets from cell sites and transmits them through transmission facilities to a packet access interface on another packet switch. A system according to this embodiment, is more completely described in U.S. Pat. No. 4,438,566, which issued to J. G. Hemmady, et al., on Aug. 1, 1995, and assigned to the assignee of this invention, and U.S. Pat. No. 5,363,369, which issued to J. G. Hemmady, et al., on Nov. 8, 1994, and also assigned to the assignee of this invention. These two patents are incorporated herein by reference. For a more complete description of CDMA telephony see Qualcomm "The Wideband Spread Spectrum Digital Cellular System Dual Mode Mobile Station Base Station Compatibility Standard", and "CDMA Digital Common Error Interface Standard".

Base stations 65, 67, and 69 send/receive ATM cells to/from PAIs 42, 44, and 46, respectively. PAIs may perform further addressing, etc., and interface the ATM cell stream to packet bus 52. These packets may then be communicated to PSTN interface 48 where these are converted to/from voice and delivered to PSTN 70. Alternatively, the ATM cell stream may be interfaced to ATM network 75 at PAI 50. To complete the description of the drawing, there is a line based telephone 80 and a wireless telephone 90. Wireless telephone 90 home base MTSO is MTSO 1. For purposes of describing the preferred embodiment of this invention, wireless telephone 90 is roaming in a "foreign" system MTSO 2.

First, a call from telephone 80 to wireless unit 90 will be described. The user of telephone 80 dials the usual telephone number of wireless unit 90. The call is received by the public switch telephone network (PSTN) 70 which routes the call according to standard practice to MTSO 1. MTSO 1, as known in the art, keeps a list of active wireless telephones. If, as in this example, the last contact with wireless telephone 90 and was in the roaming mode, MTSO 1 (the home system) requests the last known foreign switch to page for the wireless unit. In this example, MTSO 1 requests MTSO 2 to page for wireless unit 90. Also, for purposes of describing this example, wireless unit 90 is located in MTSO 2's service region.

Under current practice, MTSO 1 seizes a trunk back through PSTN 70 to MTSO 2 either via PSTN 70 or by direct trunking. MTSO 2 then performs the necessary functions for call completion to wireless unit 90. Thus, the call loops twice through PSTN 70, once from telephone 80 to MTSO 1, and once for MTSO 1 to MTSO 2.

According to the embodiment of this invention, however, a call is set up under control of MTSO 1. To this end, a speech handler 18 in MTSO 1 is allocated for the call, and connected to the PSTN 70. MTSO 1 sends the packet address of speech handler 18 to MTSO 2. A PAI in packet switch 35 (42 in this example) receives the address and starts transmitting/receiving packets from wireless unit 90. These packets are placed on packet bus 52 through PAI 50 and onto ATM network 75. Packets are routed through ATM network 75 to MTSO 1 at PAI 20. They are then placed on packet bus 22 and are received at speech handler 18. Thus, a call is set up between telephone 80 and wireless unit 90, wherein MTSO 1 is responsible for the call even though wireless unit 90 is roaming. This gives the wireless user the advantage of having all of the facilities, record keeping, and services available that the user is used to, even while roaming.

In the opposite direction, wireless unit 90 places a telephone call to telephone 80. In this example, wireless unit 90 in cell 64 requests call setup. MTSO 2 (the serving switch), after consulting its roaming list, sends information that the wireless unit is requesting a setup to MTSO 1 (the home switch). MTSO 1 then allocates speech handler 18 and the packet address of speech handler 18 is sent to MSTO 2. MTSO 2 delivers the address to packet switch 35 and to PAI 42. Packets are then transmitted between speech handler 18 through packet bus 22, PAI 20, ATM network 75, PAI 50, packet bus 52, and PAI 42, to cell 64. Wireless unit 90 may then place a call into the public switch telephone network 70 using the facilities and services provided by MTSO 1. The services may include, for example, dual tone multifrequency (DTMF) signaling between wireless unit 90 and MTSO 1. Such novel setup, wherein a call originating at a foreign switch is controlled by its home switch, provides significant advancement over the art in that all of the usual facilities and services are available to the wireless user, even in a roaming mode. This invention also provides a savings in trunk resources over the prior art.

Figure 2:
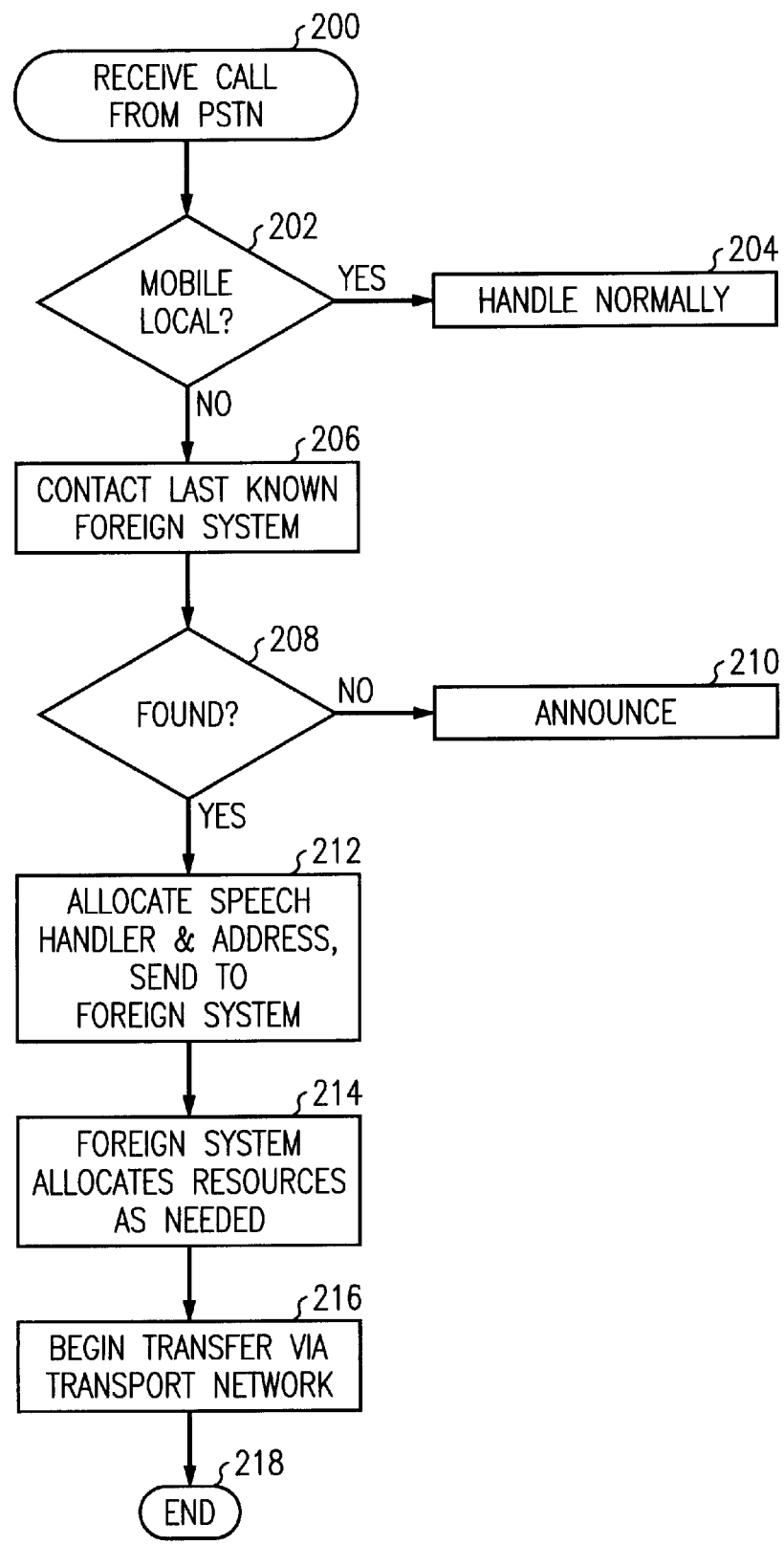
FIG. 2 is a flow chart of routing of a call to a roaming wireless unit.

Turning now to FIG. 2, a flow chart of processing an incoming call is shown. Processing starts in circle 200, where a call is received from PSTN 70. In decision diamond 202, the home system determines whether the mobile is in the local service area. If the mobile is local, then the call is handled normally in action box 204. If the mobile is not local, then the last known foreign system is contacted in action box 206. A determination is then made in decision diamond 208 whether the wireless unit was found. If the wireless unit was not found, then processing ends at box 210 where an announcement is made to the calling party. Alternatively, the home system may query other MTSOs in the area to page for wireless unit 90.

If, in decision diamond 208, the mobile unit is found in a foreign MTSO, then, in action box 212 a speech handler is allocated and the address of the speech handler is sent to the foreign system. In action box 214, the foreign system allocates resources as needed, and in action box 216 there is a transference between MTSO 1 and MTSO 2, via a transport network and, in this example, ATM network 75, and processing ends in circle 218.

Figure 3:
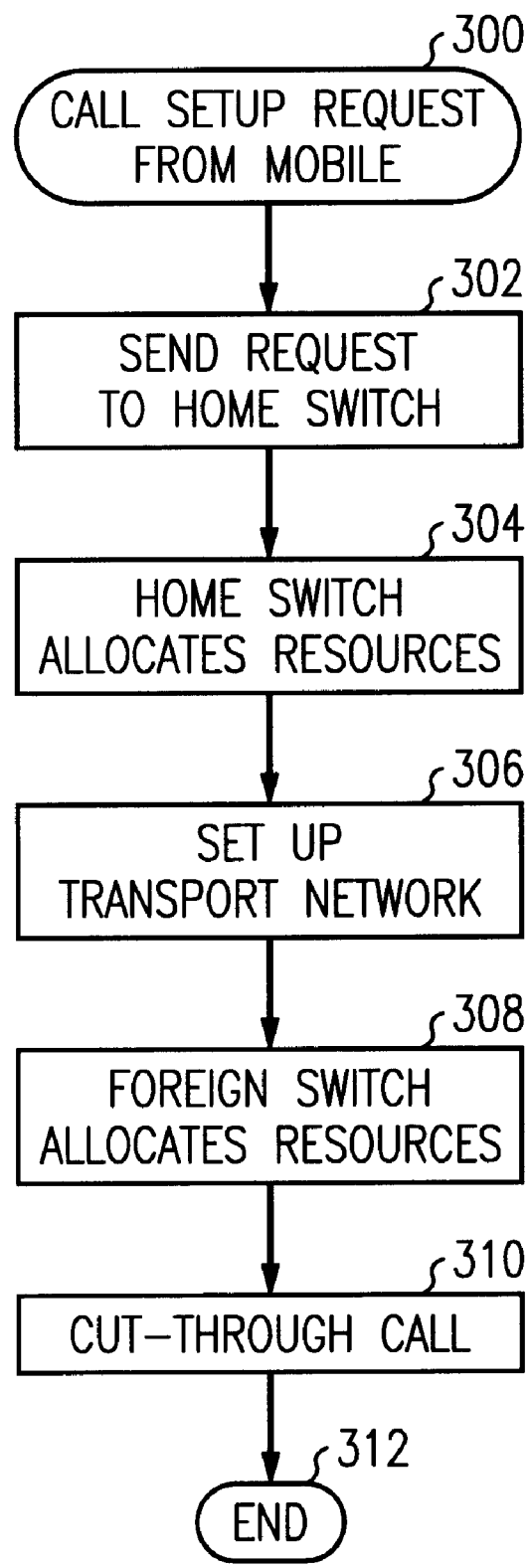
FIG. 3 is a flow chart of operations when a roaming wireless unit places a phone call.

Turning now to FIG. 3, a flow chart of a mobile call setup is described. Processing starts in circle 300 where a foreign switch receives a call setup request from a mobile. The foreign switch sends a request to the home switch in action box 302, indicating that the wireless unit is requesting service. The home switch in action box 304 allocates resources (for example, speech handlers), routes through the switch, etc., and sends this information to the foreign MTSO. The transport network is set up in action box 306 and the foreign switch allocates the sources for the call in action box 308. The call is then cut through in action box 310 and normal call processing is initiated. Processing ends in circle 312.

It is to be understood that the above-described embodiment is merely an illustrative principle of the invention and that many variations may be devised by those skilled in the art without departing from the scope of the invention. It is, therefore, intended that such variations be included within the scope of the claims.

I claim:

1. A communications network that provides service to a wireless unit from a home system when the wireless unit is located in an area supported by a serving system, said communications network including a public switched telephone network and a packet network separate from said public switched telephone network, said communications network comprising:

- a first packet network interface means at said serving system, said first packet network interface means having a unique address in said packet network;
- a second packet network interface means at said home system, said second packet network interface means also having a unique address in said packet network;
- means in said serving system responsive to a call origination request from said wireless unit for sending a packet network interface means address request to said home system with said unique address of said first packet network interface means;
- means in said home system for sending said unique address of said second packet network interface means to said serving system;
- means in said serving system for connecting said wireless unit to said first packet network interface means; and
- means in said home system for connecting said second packet network interface means to further facilities of a home switch, so that said wireless unit is provided with said facilities of said home system while it is in the area served by said serving system.

2. The communications network of claim 1 wherein, responsive to a call origination request for said wireless unit received at said home system, said home system further comprising means for sending a transmission network interface means address request to said serving system with said unique address of said second packet network interface means; and said serving system further comprising means for sending said unique address of said first packet network interface means to said serving system.

3. The communications network of claim 1 wherein said packet network comprises an asynchronous transfer mode network.

4. The communications network of claim 1 wherein said facilities of said home system includes features subscribed to by said wireless unit.

5. The communications network of claim 1 wherein said home system includes means for interfacing said home system to the public switched telephone network and for connecting said wireless unit to said means for interfacing said home system to the public switched telephone network.

6. The communications network of claim 1 wherein said home system's and serving system's air interfaces comprise digital, subrate packet interfaces, said first packet network interface sending subrate packets over said packet network to said second packet network interface, and said facilities at said home switch including means for converting said subrate packets to public switched telephone network streams, and means for converting said public switched telephone network streams into subrate packets.

7. The communications network of claim 6 wherein said digital subrate packet interface comprises code-division, multiple access (CDMA) packets.

8. The communications network of claim 6 wherein said digital subrate packet interface comprises time-division, multiple access (TDMA) packets.

9. The communications network of claim 1 wherein said facilities at said home system include means for providing dial tone to said wireless unit.

10. A method for use in a communications network to provide service to a wireless unit from a home system when the wireless unit is located in an area supported by a serving system, said communications network including a public switched telephone network and a packet network separate from said public switched telephone network, said home system and said serving system including connections to said public switched telephone network and to said packet network, said connections to said packet network having unique addresses, said communications network comprising:

said serving system responding to a call origination request from said wireless unit by sending a packet network connection address request to said home system and sending said unique address said serving system's packet network connection address;

said home system sending said unique address of said packet network connection to said serving system;

said serving system connecting said wireless unit to said serving system's packet network connection; and said home system connecting its packet network interface connection to facilities of a home switch, so that said wireless unit is provided with said facilities of said home system while it is in the area served by said serving system.

11. A method in accordance with claim 10 further comprising the steps of:

responsive to a call origination request for said wireless unit received at said home system, said home system sending a connection address request to said serving system a said unique connection address of said home system; and said serving system sending its unique connection address to said serving system.

12. A method in accordance with claim 10 further comprising the step of: said home system connecting said call to said public switched telephone network.

* * * * *